March 24, 1964
R. L. SHOALTS
3,126,154
FURNACE HEATING UNIT AND BLOWER CONTROL
Filed Dec. 29, 1960
2 Sheets-Sheet 1
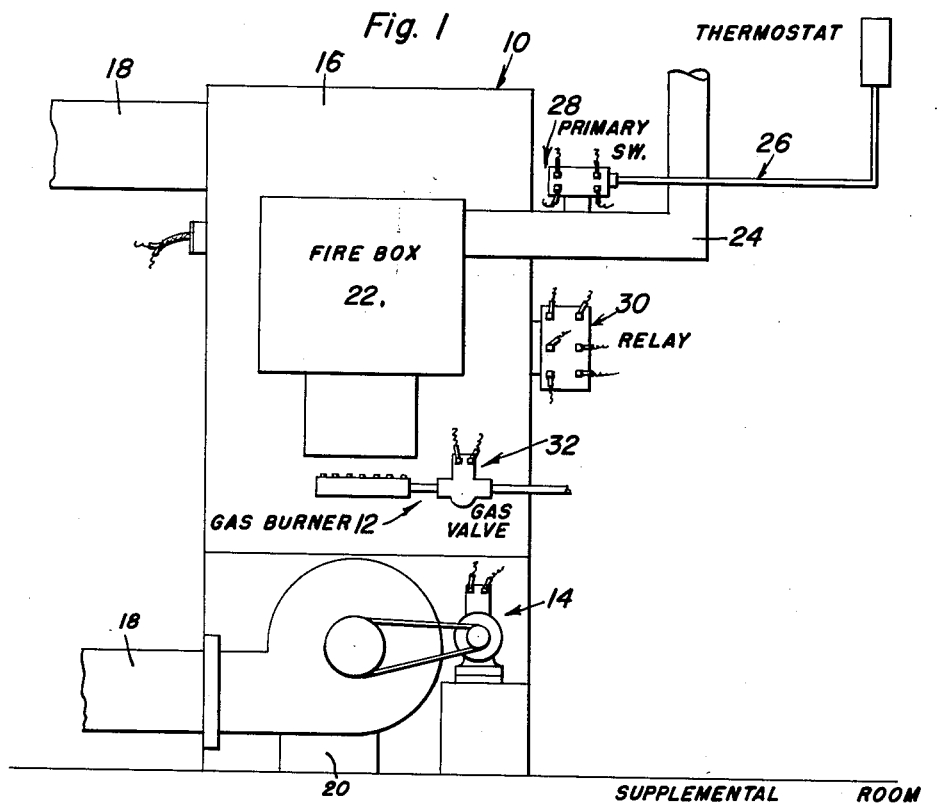
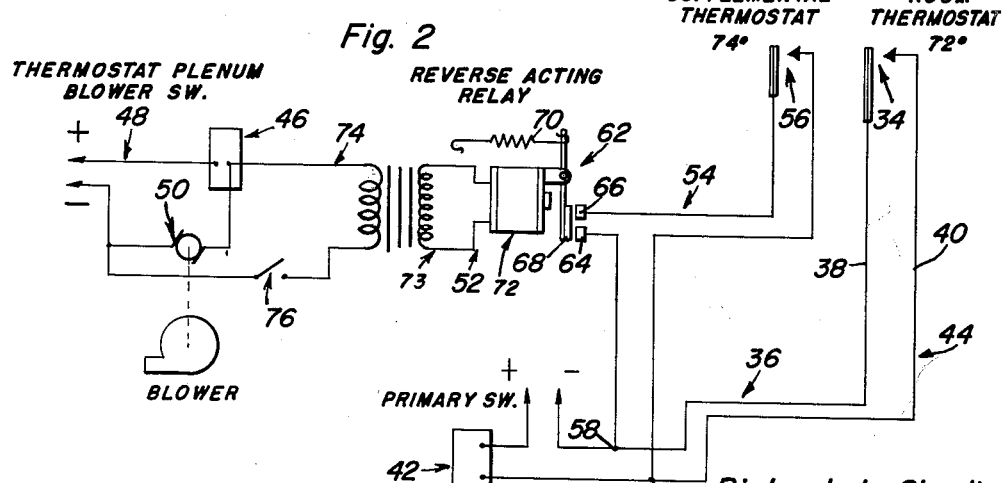
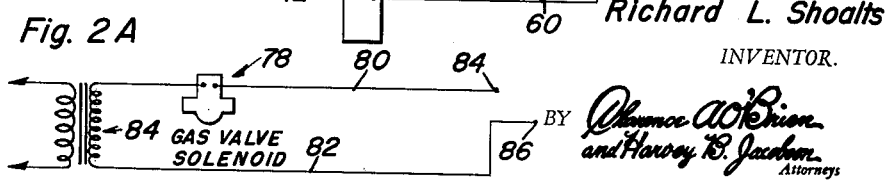
Richard L. Shoalts
INVENTOR.

March 24, 1964
R. L. SHOALTS
3,126,154
FURNACE HEATING UNIT AND BLOWER CONTROL
Filed Dec. 29, 1960
2 Sheets-Sheet 2
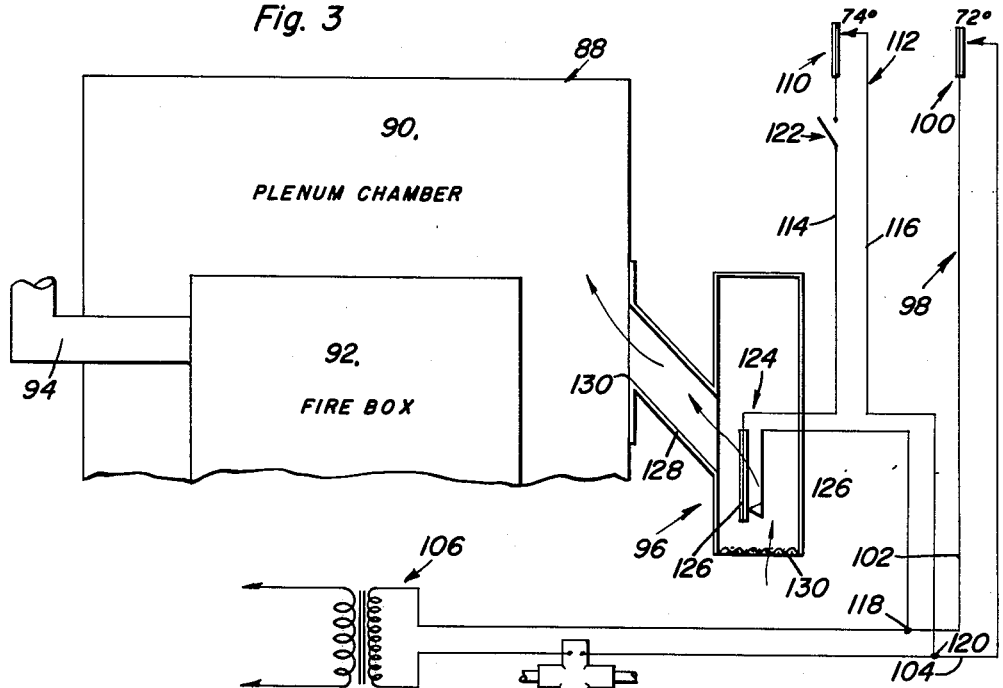
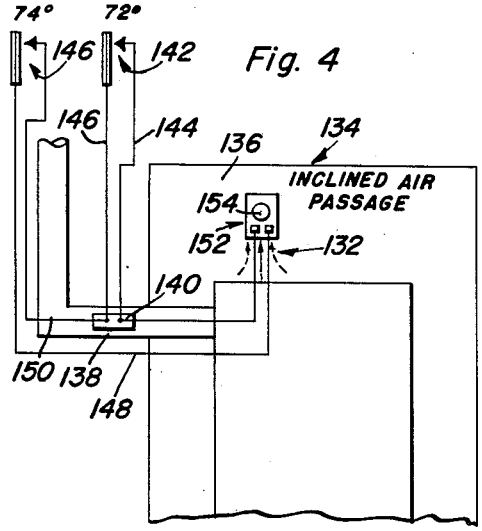
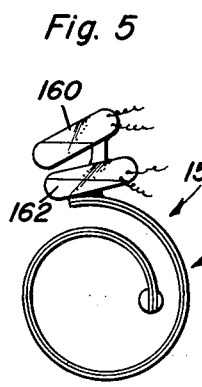
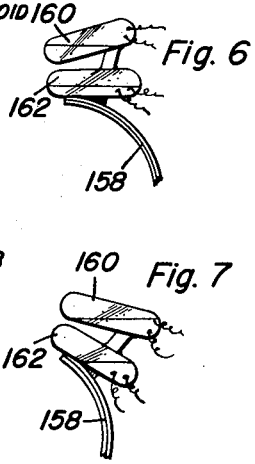
Richard L. Shoalts
INVENTOR.

United States Patent Office 3,126,154
Patented Mar. 24, 1964

3,126,154
FURNACE HEATING UNIT AND BLOWER
CONTROL
Richard L. Shoalts, 347 Hastings St.,
South Williamsport, Pa.
Filed Dec. 29, 1960, Ser. No. 79,402
2 Claims. (Cl. 236—9)

This invention relates to a novel and useful air heating system and more particularly to a cycling control for conventional hot air heating systems of the type including a furnace having separate heater and blower units provided with separate electrical control circuits controlled by space and plenum thermostats respectively.

In these conventional types of hot air heating systems the heating unit may be of any desired type such as oil or gas and the blower unit control circuit has a thermostat disposed therein which operates to actuate the blower unit after the heating unit has been started and has run a period of time sufficient to heat up the plenum chamber of the furnace. When the furnace plenum chamber reaches a predetermined temperature, the thermostat therein actuates the blower unit which continues to operate until after the space thermostat controlling the heating unit has been satisfied and the heating unit has been turned off. The blower continues to operate until the furnace has cooled to a point whereby further circulation of air through the plenum chamber of the furnace would be ineffective to deliver heated air to the rooms the furnace services at a temperature above the setting of the space thermostat. The furnace then remains dormant until the space thermostat again actuates the heating unit.

Most conventional heating systems and furnaces of this type are provided with limit switches for limiting the maximum temperature which may be obtained in the furnace plenum chamber. If desired these conventional types of limit switches may be set at a low setting which will in effect cause the heating unit to cycle after the blower has been put into operation and during the operation of the blower until the space thermostat controlling the heating unit has been satisfied. However, on extremely cold days the reduced output of the heating system whose limit control is set low may not be sufficient to maintain the temperature setting of the space thermostat even though the furnace is in continuous operation. Accordingly, when extreme cold weather arrives a homeowner must go down to his furnace and raise the limit control setting in order that the heating unit may operate for extended periods of time without cycling.

However, in some localities the fall and spring of the year include alternate periods of mild and cold weather and it becomes a nuisance to a homeowner to have to change the limit control setting of the heating unit at short intervals. Of course, the limit control on the plenum of the furnace may be purposely set high at all times in order that the furnace will be capable, in even the most extreme cold weather, of maintaining the ambient atmosphere about the space thermostat at the desired level. However, a high setting of this type uses more fuel inasmuch as the heat which cannot be picked up by the air passing through the plenum of the furnace rises from the smokestack thereof. In addition, persons living in homes equipped with conventional types of hot air heating systems oftentimes experience what has been termed "cold 70" which is experienced during the periods of time immediately before each operation of the furnace. "Cold 70" is caused by the fact that an air heating system, inasmuch as the blower continues to operate after the space thermostat is satisfied, the rooms of a house are heated to a point above the setting of the space thermostat. Thus, persons living in the house are warmed beyond the setting of the space thermostat and become temporarily accustomed to that temperature. Then when the blower of the furnace stops, the air in the various rooms serviced by the furnace stratifies and in addition the air at the level of he thermostat falls in temperature faster than the thermostat can register this fall in temperaure and therefore the temperature of the ambient atmosphere at the thermostat is somewhat lower than the setting of the thermostat before the heating system is again started. In addition, inasmuch as the heating unit of the system operates for a period of time before the blower unit is actuated to deliver heat to the rooms serviced by the furnace, the temperature of the air in the rooms drops still further before warmer air is forced into the rooms. Thus, there are three reasons why hot air heating systems are not capable of maintaining an even temperature. This fluctuation of temperature not only is uncomfortable when experienced but also increases the possibility that persons will contract colds.

It is the main object of this invention to substantially eliminate the "cold 70" situation and to maintain a more even temperature in the rooms serviced by the furnace system.

A further object of this invention, in accordance with the immediately preceding object, is to provide a means for cycling the heating unit of a hot air heating system during the operation of the blower unit of the heating system when the ambient atmosphere about the space thermostat is within a predetermined range extending within 5° F. above the setting of the space thermostat and the setting of the space thermostat. In this manner, the space thermostat may be set at the lowest temperature desired or just slightly thereabove and the furnace will cycle between that setting and a setting within 5° above that setting of the space thermostat.

Still another object of this invention, in accordance with the preceding objects, is to provide a means whereby the heating unit of the hot air heating system will cycle only when the temperature of the ambient atmosphere about the space thermostat is above the setting of the space thermostat thereby enabling the heating unit of the furnace to operate for extended periods of time when the cycling of the heating unit of the furnace is insufficient to maintain the ambient atmosphere about the thermostat at a temperature above the setting of the space thermostat. In this manner, the fuel savings and elimination of "cold 70" will be realized in mild weather and a part of the fuel savings and a portion of the "cold 70" situations will be eliminated in extremely cold weather.

A further object of this invention, in accordance with the immediately preceding objects, is to provide a supplemental control means which will be readily adaptable to substantially all types of existing hot air heating systems.

A further object of this invention is to provide a supplemental control means which will be readily adaptable to hot air heating systems using different types of fuel.

Still another object of this invention is to provide a supplemental control means in the form of substantially one design which will work effectively on different types of air heating systems.

A final object to be specifically enumerated herein is to provide a supplemental control means for conventional hot air heating systems which will conform to conventional forms of manufacture, be of simple construction and substantially automatic in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a conventional hot air heating system including a furnace having a plenum chamber and a blower and heating units, parts of the air ducts of the heating system being broken away and removed and one form of the subject of the instant invention being shown mounted on the furnace;

FIGURE 2 is a diagrammatic view of the electrical circuit and controls for the supplemental control, the supplemental control being shown utilized in conjunction with an oil hot air heating system;

FIGURE 2a is a fragmentary diagrammatical view of a portion of an electrical circuit for a gas fired heating unit which may readily be substituted for the primary switch of an oil fired furnace illustrated in FIGURE 2;

FIGURE 3 is a fragmentary side elevational view of a portion of a furnace with a portion of the supplemental control being mounted thereon and shown in section, the wiring for the supplemental control being shown diagrammatically;

FIGURE 4 is a fragmentary side elevational view of a furnace shown diagrammatically with a modification of the supplemental control mounted thereon; and FIGURES 5–7 are fragmentary side elevational views of a double thermostat which may be used in conjunction with the present invention in place of the conventional single space thermostat and the additional thermostat required by the supplemental control.

Referring now more specifically to the drawings the numeral 10 generally designates one form of conventional hot air furnaces provided with a gas heating unit generally referred to by the reference numeral 12 and an electrical blower unit generally referred to by the reference numeral 14. The furnace 10 includes a plenum chamber 16 having outlet conduits 18 in communication therewith, an inlet conduit 20 communicating with the blower unit 14 and a firebox 22 having a smokepipe 24.

One form of the supplemental control of the instant invention is shown diagrammatically and is generally designated by the reference numeral 26 incorporated within the conventional thermostatically controlled electrical circuit for the heating unit 12. The primary switch of the furnace 10 is generally designated by the reference numeral 28 and has wires connected thereto leading from the reverse acting relay which is generally designated by the reference numeral 30 and to the solenoid valve generally designated by the reference numeral 32 of the gas heating unit 12.

With attention now directed to FIGURE 2 the thermostat 34 comprises the original thermostat of a hot air heating system generally referred to by the reference numeral 36. The thermostat 34 is connected by wires 38 and 40 to the primary switch generally designated by the reference numeral 42. The wires 38 and 40 comprise an electrical control circuit for the oil fired heating unit (not shown) of the hot air heating system 36. It is to be understood that the primary switch 42 is connected with the circuit for the heating unit to actuate the latter in response to the thermostat 34 closing the elecrical heater control circuit which is generally designated by the reference numeral 44. Upon the closing of the thermostat 34, the primary switch 42 will actuate the oil fired heating unit of the air heating system 36. After the plenum of the furnace of the air heating system 36 has reached a predetermined temperature, the thermostat (not shown) in the fan switch generally designated by the reference numeral 46 will close the electrical blower control circuit generally designated by the reference numeral 48 and effect operation of the blower generally designated by the reference numeral 50. After the space thermostat 34 has been satisfied, the circuit 44 will be opened and the heating unit (not shown) controlled by the primary switch 42 will be deactivated. Thereafter, after continued operation of the blower 50 the temperature in the furnace plenum chamber will be lowered and the thermostat in the fan switch 46 will open the circuit 48 to terminate the operation of the blower unit 50. The above description of the operation of the hot air heating system 36 is conventional and is to be understood as such.

The supplemental control of the instant invention is generally designated by the reference numeral 52 and includes a supplemental control circuit generally referred to by the reference numeral 54 including a thermostat generally designated by the reference numeral 56 and disposed in series in the circuit 54 which is in turn connected to the circuit 36 in parallel at points 58 and 60.

The circuit 54 includes a relay generally designated by the reference numeral 62. Supplemental circuit 54 also includes spaced contacts 64 and 66 and a bridging contact 68 carried by the relay 62 and normally urged into contact with the contacts 64 and 66 by means of spring 70. However, the relay 62 is also provided with a solenoid generally referred to by the reference numeral 72 actuated by a transformer 73. The transformer 73 is disposed in the blower control circuit 48 by means of a supplemental blower circuit generally referred to by the reference numeral 74. The circuit 74 is connected in parallel to the circuit 48 and includes an "on" "off" switch generally referred to by the reference numeral 76.

In operation, after the heating unit of the hot air heating system 36 is actuated by the primary switch 42 upon closing of the thermostat 56, the temperature in the plenum of the furnace will rise to actuate the blower switch 46 to operate the blower 50. The closing of the blower circuit 48 actuates the supplemental circuit 74 whereupon the solenoid 72 withdraws the bridging contact 68 from engagement with the contacts 64 and 66 against the tension of the spring 70 and thus interrupts the supplemental circuit 54 to terminate actuation of the heating unit of the hot air heating system 36. Inasmuch as the supplemental thermostat 56 is set approximately two degrees higher than the original thermostat 34, as the temperature about the thermostats 34 and 56 decreases the thermostat 56 is first actuated to start the operation of the heating unit. Accordingly, the thermostat 34 at this time is substantially ineffective to operate the heating unit. After the blower 50 has reduced the temperature in the plenum chamber of the furnace to a predetermined point, and assuming the supplemental thermostat 56 is not satisfied, the blower unit 50 will stop by the opening of the blower switch 46 which will in turn enable the spring 70 to urge the bridging contact 68 into engagement with the contacts 64 and 66. The heating unit serviced by the primary switch 42 is then again started and will continue to operate until such time as the temperature in the plenum chamber of the furnace is again sufficient to effect operation of the blower unit 50. It may thus be seen that the supplemental control 52 will effect cycling of the heating unit until such times as the thermostat 56 is satisfied or until the temperature about the original thermostat 34 is not sufficient to satisfy that thermostat whereupon the thermostat 34 will maintain the heating unit in operation until such time as the thermostat 34 is satisfied. Thus, in mild weather the operation of the heating unit is dependent upon the supplemental thermostat 56 which is set approximately two degrees higher than the original thermostat 34. Under the control of the supplemental thermostat 56 the heating unit will cycle inversely with the blower unit thereby maintaining the temperature of the rooms serviced by the heating system at a more constant temperature. This will substantially eliminate the "cold 70" situation and will also effect a more economical operation of the heating unit. However, when extremely cold weather is experienced and the cycling of the heating unit is not sufficient to maintain the temperature of the rooms serviced by the heating system between the setting of the thermostat 56 and the thermostat 34, as soon as the temperature falls below the lower setting of the thermostat 34 the heating unit will be operated continuously until such time as the thermostat 34 is satisfied. Thus, it may be readily appreciated that the supplemental control 52 operates in a manner superior to the manner in which conventional limit switches operate to cycle the heating unit of hot air heating systems, which manner oftentimes proves to be ineffective to maintain the desired temperature in extremely cold weather.

Referring now more specifically to FIGURE 2a, there will be seen a gas heater unit control valve solenoid generally referred to by the reference numeral 78 having a control circuit therefor including wires 80 and 82, there being a transformer 84 disposed in the wire 82. The wires 80 and 82 each terminate remote from the solenoid 78 at points 84 and 86. With attention again directed to FIGURE 2 of the drawings, it is to be understood that the supplemental control 52 may be used in conjunction with a gas fired furnace of which the structure in FIGURE 2a comprises a part. In this instance, the primary switch and the wire leading therefrom to the points 58 and 60 may be substituted for by the structure illustrated in FIGURE 2a with the points 84 and 86 of the wires 80 and 82 respectively connected at points 58 and 60.

Referring now more specifically to FIGURE 3 of the drawings there will be seen a furnace generally referred to by the reference numeral 88 including a plenum chamber 90 and a firebox 92 having a smokepipe 94.

A modified form of the supplemental control of the instant invention is generally designated by the reference numeral 96. The original heating unit electrical control switch for the furnace 88 is generally designated by the reference numeral 98 and includes thermostat 100 and wires 102 and 104 which lead to a transformer generally designated by the reference numeral 106 and the gas valve solenoid generally designated by the reference numeral 108. The supplemental control 96 includes a supplemental thermostat 110 including a supplemental circuit generally referred to by the reference numeral 112 and including wires 114 and 116 which are connected in parallel to the circuit 98 at points 118 and 120 respectively.

The wire 114 includes an "on" "off" switch generally designated by the reference numeral 122 and a thermostat generally designated by the reference numeral 124 including a bi-metallic member 126.

Secured to the plenum 90 is a downwardly and outwardly inclined conduit 128 whose upper end is secured about an opening 130 formed in the plenum chamber. The bottom of the conduit 128 has a screen 131 across the opening therein and the thermostat 124 is disposed in the conduit 128. The thermostat 124 is constructed in a manner whereby the bi-metallic member 126 will open the circuit 112 in response to heated air passing through the conduit 128. In operation, as the furnace 88 is actuated and the blower thereof comes on after the heating element has warmed the plenum chamber 90, the pressure effected in the plenum chamber by the blower forces warm air downwardly and outwardly through the conduit 128 which warms the bi-metallic member 126 and opens the circuit 112 thus terminating the operation of the heating unit by causing the solenoid 108 to close the valve of the gas line therefor. Then, after the plenum chamber 90 cools and the conventional plenum fan thermostat (not shown) terminates operation of the blower, cool air from the ambient atmosphere is drawn up through the conduit 128 as shown by the arrows in FIGURE 2 and cools the bi-metallic member 126 and again closes the circuit 112 to again start operation of the heating unit and thereafter operation of the blower.

The thermostat 100 is the original thermostat and is set approximately two degrees below the supplemental thermostat 110. Thus, in mild weather the supplemental thermostat 110 controls the solenoid 108 and in turn the heating unit (not shown) of the furnace 88. However, when extremely cold weather comes the cycling of the heating unit effected by the supplemental control 96 will be ineffective to satisfy the thermostat 110 and even the thermostat 100 whereupon the thermostat 100 will then effect continued operation of the heating unit until such time as the thermostat 100 is satisfied.

With attention now directed to FIGURE 4 of the drawings there will be seen a still further modification of the supplemental control of the instant invention generally designated by the reference numeral 132. The furnace is generally designated by the reference numeral 134 and includes a plenum chamber 136 and a smokepipe 138. It is to be understood that the furnace 134 is of the oil fired type and includes a primary switch 140 for effecting operation of the oil fired heating unit (not shown). The conventional thermostat is generally designated by the reference numeral 142 and is connected to the primary switch 140 by means of wires 144 and 146. The operation of the furnace 134 is conventional without the supplemental control 132. The supplemental control 132 includes a supplemental thermostat generally designated by the reference numeral 146 which is connected to the primary switch 140 by means of wires 148 and 150. It is to be noted that an inclined passage having a thermostat disposed therein is diagrammatically illustrated and generally designated by the reference numeral 152. The thermostat (not shown) is similar to the thermostat 124 and the inclined passage is similar to the inclined passage 128. A control knob 154 may be provided for varying the temperature at which the thermostat within the inclined passage 152 will be actuated to open the supplemental circuit of the supplemental control 132.

It is to be understood that the primary switch 140 is substantially similar to the primary switch 42 in that it is mounted on the smokepipe 138 of the furnace 134. The primary switch 140 may include a limit switch for opening the circuit to the heating unit of the furnace 134, it may include a safety switch which will be capable of stopping operation of the pump for the oil fired heater in case the oil in the furnace 88 should not be ignited within a predetermined time, and it may also include other conventional controls. However, it is noted that the circuit of the supplemental control 132 is connected in parallel to the circuit in which the conventional room thermostat 142 is disposed. The supplemental controls 52 and 96 each also have their respective supplemental circuits connected to the corresponding conventional and original room thermostat circuits in parallel relation thereto.

With attention now directed to FIGURES 5-7 of the drawings, there will be seen a double thermostat generally designated by the reference numeral 156 which includes a coiled bi-metallic member 158. Upon a decrease in temperature the bi-metallic coil will tend to straighten from the position illustrated in FIGURE 5 first to the position illustrated in FIGURE 6 and then to the position illustrated in FIGURE 7. A mercury switch generally referred to by the reference numeral 160 is mounted on the bimetallic coil 158 and has two spaced wires connected thereto and are also directly connected to the control of the heating unit of the furnace controlled by the thermostat 156. Thus, the bimetallic member 158 and the mercury switch 160 comprises the conventional thermostat while the mercury switch 162 comprises the supplemental room thermostat. The mercury switches 160 and 162 are disposed at slight inclinations relative to each other and it will be noted that upon a decrease in temperature the mercury switch 162 which is to be connected to the supplemental control is actuated first. If the cycling operation of the heating unit of the furnace connected to the thermostat 156 is not sufficient to maintain the temperature about the thermostat 156 at the desired level, the bi-metallic member 158 will straighten further to tilt the mercury switch 160 an amount to actuate the conventional thermostat control circuit of the heating unit whereupon the heating unit will operate continuously until such time as the ambient atmosphere raises in temperature an amount sufficient to return the bi-metallic member 158 from the position illustrated in FIGURE 7 to the position illustrated in FIGURE 6 whereupon the mercury switch 162 will then again effect cycling of the heating unit of the furnace.

While the mercury switches 160 and 162 have been illustrated as rigidly mounted relative to each other, it is to be noted that they could be adjustably mounted in a manner so as to enable the relative inclination of the mercury switches 160 and 162 to be adjusted to increase and decrease the range between the settings of the two mercury switches.

With attention again directed to FIGURE 3, the bi-metallic member 126 is cooled to close the supplemental circuit 112 by the natural chimney effect created in the inclined conduit after the blower of the furnace 88 has stopped operating while the plenum 90 of the furnace 88 is cooling to the temperature of the ambient atmosphere about the furnace 88.

In view of the foregoing it may be readily appreciated that the supplemental control of the instant invention may be readily adapted to substantially all types of conventional hot air heating systems and that the supplemental control will substantially eliminate the "cold 70" situation and effect a more efficient operation of the furnace. In addition, while the supplemental control is capable of effecting cycling of the heating unit of a furnace, it is designed in such a manner that the operation of the furnace will return to normal if extreme cold weather prevails and requires more than cycling operation of the heating control unit of the furnace.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a conventional hot air heating system of the type including a furnace having separate heater and blower units provided with separate electrical control circuits controlled by space and plenum thermostats respectively disposed in said circuits, a plenum chamber and an exhaust pipe, supplemental control means including a supplemental control circuit connected to said heater control circuit, supplemental space thermostat means connected in series to said supplemental control circuit for cycling said heater unit during operation of said furnace, said conventional space thermostat being set to actuate said heater control at a given temperature and said supplemental space thermostat servicing generally the same area as said conventional space thermostat and being set to actuate said heater control at a temperature slightly above the setting of said conventional space thermostat, said supplemental control including an outwardly and downwardly inclined passage communicating the interior of said plenum with the exterior of said furnace, a thermostat connected in series in said supplemental control circuit, disposed in said passage to open said supplemental control circuit in response to warm air passing downwardly and outwardly through said passage.

2. The combination of claim 1, wherein said supplemental thermostat comprises a part of said space thermostat, said space thermostat including a mercury switch mounted on a bimetallic member, said supplemental thermostat comprising a mercury switch mounted on said bimetallic member inclined relative to said first-mentioned mercury switch.

References Cited in the file of this patent

UNITED STATES PATENTS

| | | |
|---|---|---|
| 1,564,804 | Warren | Dec. 8, 1925 |
| 1,983,429 | Albright | Dec. 4, 1934 |
| 1,991,680 | Jones | Feb. 19, 1935 |
| 2,083,664 | Persons | June 15, 1937 |
| 2,238,219 | Fineran | Apr. 15, 1941 |
| 2,369,044 | Hallinan | Feb. 6, 1945 |
| 2,455,250 | Hallinan | Nov. 30, 1948 |
| 2,615,634 | Harbin | Oct. 28, 1952 |